United States Patent Office 3,446,886
Patented May 27, 1969

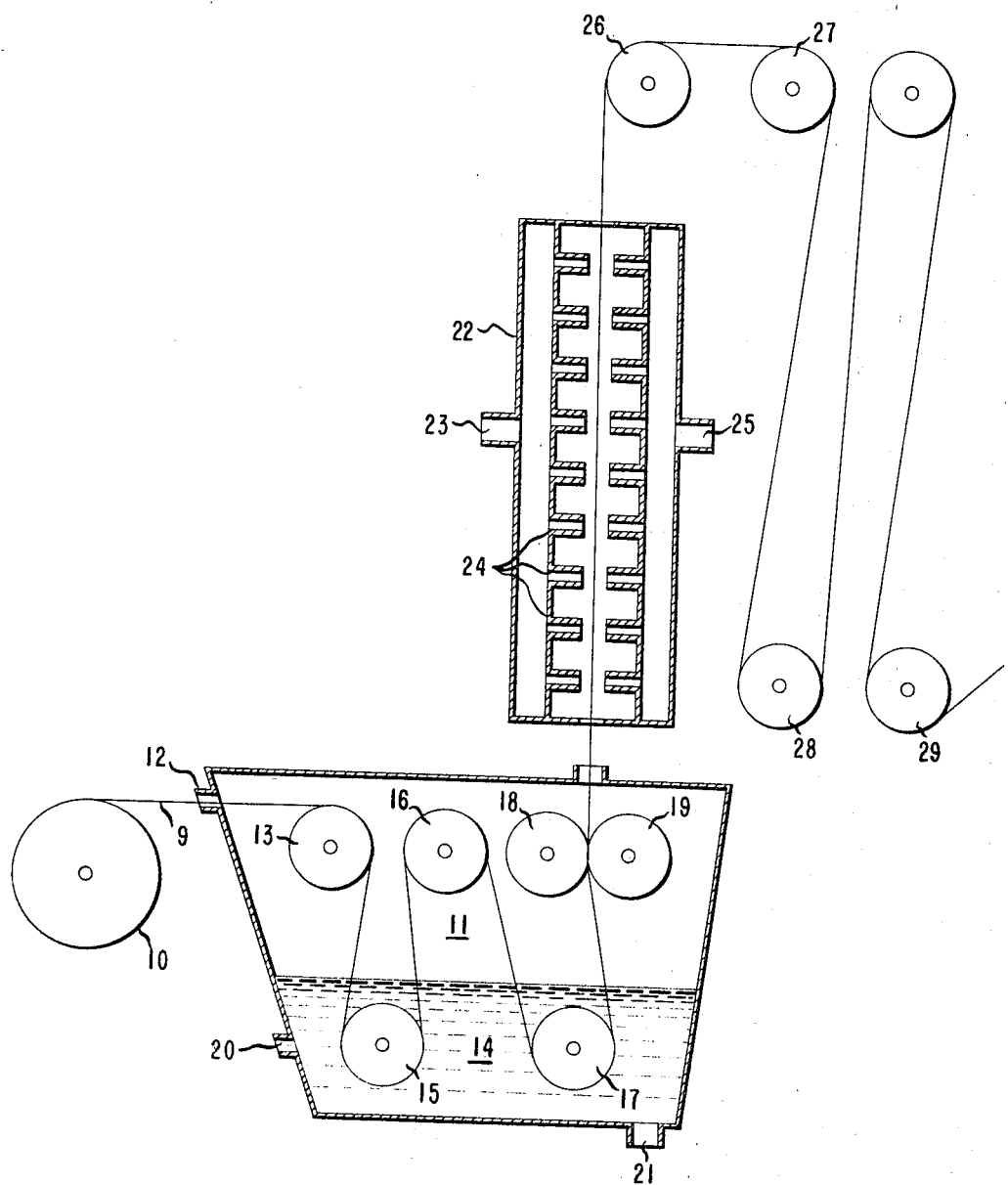

3,446,886
PROCESS FOR TREATING LINEAR POLYESTERS TO MODIFY THE SURFACE APPEARANCE AND CHARACTERISTICS THEREOF
Michael Karickhoff, Circleville, Ohio, assignor to E. I. du Pont de Nemours and Company, Wilmington, Del., a corporation of Delaware
Filed Dec. 4, 1963, Ser. No. 328,074
Int. Cl. B29d 7/22
U.S. Cl. 264—234          1 Claim

ABSTRACT OF THE DISCLOSURE

A process is provided for treating film structures of linear polymeric polyesters to modify the surface appearance and the surface characteristics thereof by contacting amorphous linear polyester film structures with an organic modifying agent having a dye receptivity-opacity development rating of at least 130 for a period of between five seconds and five minutes, followed by removing excess organic modifying agent and biaxially orienting said film structure, and thereafter heat-setting said film structure.

This invention relates to processes for treating polyester films and more particularly to processes for pretreating polyethylene terephthalate films with liquid organic modifying agents.

Highly polymeric synthetic linear polyesters from aromatic dicarboxylic acids and glycols having from 2–10 carbon atoms, such as those disclosed by Winfield and Dixon in U.S. 2,465,319 possess many properties which, in the form of self-supporting films, make them useful as articles of commerce.

Polyethylene terephthalate film, more particularly, polyethylene terephthalate film which has been molecularly oriented by stretching and/or rolling in two mutually perpendicular directions, is a tough, durable, dimensionally stable film. It possesses many desirable characteristics which makes it an outstanding candidate for employment in drafting, recording, and servicing applications. These films, however, possess limitative ability to accept ink, pencil markings, and having undesirable high gloss and transparency for these applications. Attempts have been made to overcome these disadvantages by the incorporation of additives, the application of coatings, chemical treatments, and mechanical abrasion. Additives to the polymer may interfere with the preparation of the polymer; coatings are frequently inferior to the base film in toughness, may delaminate, or be poor in abrasion resistance. All of these processes add complications and expense to the preparation of the desired product.

It is, therefore, an object of this invention to provide a process for the modification of the surface of linear polymeric polyester films to impart to the films such unique surface characteristics as improved wicking action, reduced surface gloss, improved slip, and greater receptivity to ink and pencil markings.

It is another object of this invention to provide a process for the preparation of oriented, linear polymeric terephthalate ester films having unique surface characteristics such as low gloss, improved impregnability, slip, and writability.

It is a further object of this invention to provide a process for the preparation of oriented polyethylene terephthalate film having improved surface characteristics.

It is a still further object of this invention to provide a process for the preparation of oriented polyethylene terephthalate film having unique decorative surface effects. These and other objects will appear hereinafter.

These and other objects of this invention are accomplished by the process of contacting an amorphous polymeric linear polyester film for a period of time within the range of about 5 seconds to 5 minutes, preferably 30 seconds to 1 minute, with at least one liquid organic modifying agent having a dye receptivity-opacity development rating of at least 130, preferably at least 150; removing the excess liquid; molecularly orienting the film by stretching in both the longitudinal and transverse directions to an extent of at least 2.5 times its original dimensions and heat-setting the film at a temperature of at least 150° C.

Liquid treating apparatus for conducting the process of the present invention is shown in the attached drawing.

The film 9 is unwound from a driven unwind roll 10, passed into an enclosed organic liquid containing treating tank 11 through inlet 12, over roll 13, downward below the level of the liquid 14 in the liquid tank under roll 15, upward over roll 16, again passed below the liquid level under roll 17, and finally conducted between the nips of rolls 18 and 19 where excess liquid is removed. The various organic liquids to be employed are introduced into the treatment tank at room temperature through inlet 20 and returned to the liquid recovery system (not shown) through outlet 21. The contact (dwell) time of the film in the organic liquid is determined by the speed at which the film is passed through the system by the driven unwind and wind-up rolls.

After passing through the nips of wiper rolls 18 and 19, the thus treated film is passed upward through a liquid drying tower 22. Air heated by steam pressures is introduced into the drying tower through inlet 23 and 25 and forced against the passing film by means of air jets such as shown by 24. The spent air containing residual organic liquid in vapor form is withdrawn through the top of the tower with the film and is withdrawn under vacuum from the system through an outlet (not shown) and conveyed to an exhaust system (not shown). After passing through the dryer, the film is further exposed to the air by passing over or under a series of rolls (26 to 29 inclusive) and wound up on a wind-up roll (not shown).

An obvious variation of the apparatus for conducting the process is to conduct the film into the treating tank directly from the casting drum and to pass the treated, dried film directly to the stretching apparatus; thus providing a continuous operation.

The process of the present invention provides tough, durable polymeric linear polyester films possessing a wide variety of unique surface characteristics such as improved wicking action, reduced surface gloss, improved slip, and greater receptivity to ink and pencil marking.

Although, because of its commercial importance, in the examples to follow particular emphasis will be placed on the production of modified polyethylene terephthalate film, it is to be understood that the process of the invention is applicable to polyester films derived from an aromatic dicarboxylic acid or an alkyl ester thereof having 1–7 carbon atoms in the alkyl group and a polymethylene glycol having 2–10 carbon atoms. Examples of some of the more important aromatic dicarboxylic acids include:

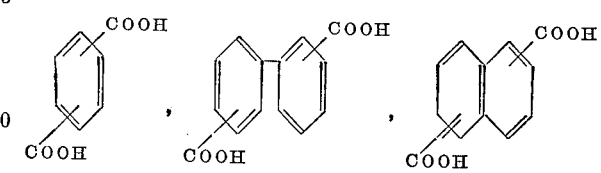

and

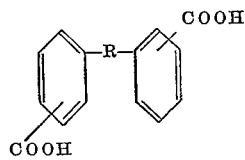

wherein R is selected from the group consisting of an alkylene chain having 1-3 carbon atoms,

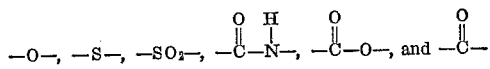

The preferred acids are terephthalic acid, isophthalic acid, bibenzoic acid, 1,5-naphthalene dicarboxylic acid, 2,6-naphthalene dicarboxylic acid and 2,7-naphthalene dicarboxylic acid. The preferred polymethylene glycol is ethylene glycol. However, at least one or more of the following can be used: ethylene glycol, diethylene glycol, propylene glycol, butylene glycol, decamethylene glycol, neopentyl glycol and trans-bis-1,4-(hydroxymethyl) cyclohexane.

The agents employed as surface modifiers in the process of this invention are those liquid or solid organic compounds which, by themselves in liquid form or as a solution in a non-modifying liquid, upon contacting the surface of the film to be heated for a period between 5 seconds and 5 minutes produce a dye receptivity-opacity development rating of at least 130. The most preferred modifying agents are the organic liquid compounds having a rating of at least 150.

Dye receptivity is measured by dipping a sample of the film to be treated into a bath containing the liquid organic modifying agent to be tested for 30 seconds. The sample is removed and dipped into a boiling water bath containing 1% methylene blue. The amount of dye retained by the film sample, as reflected by the intensity of the color of the sample, is observed visually. The dye receptivity rating for the various liquid organic agents tested can range from 0 to 100, measured in increments of 20, wherein a rating of 0 indicates no dye receptivity on the part of the treated film sample as reflected by little or no color, and a rating of 100 indicates a very superior retension of the dye as evidenced by a very deep color.

Opacity is measured by dipping a sample of the film to be treated into the bath containing the liquid organic modifying agent to be tested for 30 seconds. The sample is air dried, and the opacity expressed in terms of percent as measured by a standard model Gardner automatic pivotable-sphere haze meter (Model AUX-10), manufactured by the Gardner Laboratories, Inc., Bethesda, Md.

It has been found that the effectiveness of the organic liquid is a direct function of its ability to penetrate dyestuff into the film surface and to develop a high degree of film opacity. Oragnic liquids having a dye receptivity-opacity development rating greater than 130, preferably 150, have proved to be effective surface modifiers for the polyester films described hereinbefore. Dye receptivity-opacity development rating equals the dye receptivity rating plus the opacity (percent).

Table I below summarizes the results of various organic agents tested. Listed are the dye receptivity, percent opacity, the dye receptivity-opacity development rating, and the surface modification ability of the agent tested.

TABLE I.—DYE RECEPTIVITY-OPACITY DEVELOPMENT EVALUATION OF VARIOUS LIQUID ORGANIC AGENTS

| Agent evaluated | Dye receptivity rating | Percent opacity developed on treated film | Dye receptivity-opacity development rating | Ability to modify surface of treated film |
|---|---|---|---|---|
| 1. Piperidine | 0 | 4 | 4 | No. |
| 2. 1,1,1-trichloroethane | 0 | 23 | 23 | No. |
| 3. 2-(2-aminoethylamino)ethane | 0 | 47 | 47 | No. |
| 4. 2-aminoethanol | 0 | 78 | 78 | No. |
| 5. Benzene | 20 | 7 | 27 | No. |
| 6. Tetrahydrofuryl alcohol | 20 | 34 | 54 | No. |
| 7. O-chlorotoluene | 20 | 48 | 68 | No. |
| 8. Perchloroethylene | 20 | 41 | 61 | No. |
| 9. Acetonitrile | 20 | 47 | 67 | No. |
| 10. N-hexylformate | 20 | 46 | 66 | No. |
| 11. Pyridine | 40 | 100 | 140 | Yes. |
| 12. Pyrrole | 40 | 100 | 140 | Yes. |
| 13. Dichloromethane | 40 | 198 | 238 | Yes. |
| 14. O-chloroaniline | 40 | 100 | 140 | Yes. |
| 15. O-dichlorobenzene | 40 | 68 | 108 | No. |
| 16. Benzyl alcohol | 40 | 93 | 133 | Yes. |
| 17. Cyclohexanone | 60 | 91 | 151 | Yes. |
| 18. Acetone | 60 | 69 | 129 | Slight. |
| 19. P-dioxane | 60 | 100 | 160 | Yes. |
| 20. Epichlorohydrin | 60 | 99 | 159 | Yes. |
| 21. Tetrahydrofuran | 60 | 100 | 160 | Yes. |
| 22. 2,4-pentadione | 80 | 98 | 178 | Yes. |
| 23. Benzaldehyde | 80 | 99 | 179 | Yes. |
| 24. N,N-dimethylformamide | 80 | 99 | 179 | Yes. |
| 25. N,N-dimethylacetamide | 80 | 100 | 180 | Yes. |
| 26. Salicylaldehyde | 80 | 98 | 178 | Yes. |
| 27. Phenylethylamine | 100 | 98 | 198 | Yes. |
| 28. Dibromochloromethane | 100 | 100 | 200 | Yes. |
| 29. 1,2-dichloroethane | 100 | 98 | 198 | Yes. |
| 30. O-toluidine | 100 | 100 | 200 | Yes. |
| 31. s-tetrachloroethane | 100 | 100 | 200 | Yes. |
| 32. 1,1,2-trichloroethane | 60 | 80 | 140 | Yes. |
| 33. Benzylamine | 80 | 100 | 180 | Yes. |
| 34. Aniline | 100 | 72 | 172 | Yes. |
| 35. s-Tetrabromoethane | 40 | 100 | 140 | Yes. |

An organic solid dissolved i na non-modifying solvent can produce a surface modified polyethylene terephthalate film. A modifying organic liquid can also be mixed with a non-modifying liquid to obtain a modifying solution. Illustrated below are the dye receptivity-opacity development rating and surface modification ability of these agents.

Varying amounts of solid tetramethylbutylphenol (TMBP) are dissolved in ethanol, a non-modifying liquid. The results are as follows:

| Percent TMBP in ethanol | Dye receptivity rating | Percent opacity developed on treated film | Dye rec. op. dev. rating | Ability to modify surface of treated film |
|---|---|---|---|---|
| 0 | 0 | 0 | 0 | No. |
| 10 | 70 | 70+ | 140+ | Yes. |
| 20 | 70 | 70+ | 140+ | Yes. |
| 30 | 70 | 70+ | 140+ | Yes. |
| 40 | 70 | 70+ | 140+ | Yes. |
| 50 | 70 | 70+ | 140+ | Yes. |

Methylene chloride (modifier) is mixed with ethanol (non-modifier) and benzylamine (modifier) is mixed with water (non-modifier). The results are shown below with similar results being obtained with dioxane in ethanol and dimethylformamide in ethanol.

| Percent MeCl in ethanol | Dye receptivity rating | Percent opacity developed on treated film | Dye rec. op. dev. rating | Ability to modify surface of treated film |
|---|---|---|---|---|
| 0 | 0 | 0 | 0 | No. |
| 80 | 60 | 70+ | 130+ | Yes. |
| 70 | 60 | 70+ | 130+ | Yes. |
| 60 | 60 | 70+ | 130+ | Yes. |

| Percent benzylamine ethanol | Dye receptivity rating | Percent opacity developed on treated film | Dye rec. op. dev. rating | Ability to modify surface of treated film |
|---|---|---|---|---|
| 0 | 0 | 0 | 0 | No. |
| 90 | 70 | 70+ | 140+ | Yes. |
| 80 | 60 | 70+ | 130+ | Yes. |

The film to be treated can be contacted for a length of time from 5 seconds to 5 minutes, with a dwell (contact) time of 30 seconds to 1 minute being preferred.

Several factors must be considered in defining the residence time of polyethylene terephthalate in the modifying organic liquid. These factors are film thickness and the activity and ultimate effect of the modifying organic liquid. The observed film modification results from an interaction of the modifying agent and the film surface. With thick cast films, e.g., 10 mils, the degree of surface modification has no adverse effect on stretching after treatment. This is true with the most active modifiers. In this case 5 seconds or 5 minutes makes no difference. On the other hand, the preparation of 0.5 mil stretched films after treatment with the more active modifiers is more difficult. Treatment here is important since longer residence times will effectively reduce the polyethylene terephthalate core available for stretching.

After contacting the film with the surface modifying agent, the excess liquid is removed from the film by such conventional means as air-drying or by passing the film between two doctor rolls.

The thus treated film is then molecularly oriented by stretching it to an extent of at least 2.5, preferably 3.0 times its original dimensions in both its longitudinal and transverse directions.

The film can be stretched in the conventional manner to the required extent such as by stretching the film first in the transverse direction in a tentering device at a temperature of 85 to 100° C. followed by longitudinal direction stretching in a nip-roll stretching apparatus at a temperature of 85 to 92° C. such as described in U.S. Patent 2,995,779, or by stretching the film first in the longitudinal direction at a temperature of 90 to 96° C. in an idler roll apparatus, such as described in U.S. Patent No. 2,823,421, and thereafter, stretching the film in the transverse direction in a tentering device.

At the temperatures employed for stretching, the rates of stretch can range from 5,000% per minute to 65,000 per minute. Normally stretching rates of 7,000 to 22,500% per minute are employed.

After the stretching operations, the film can be heat-set under tension to impart to the film an enhanced dimensional stability and elevated temperatures. The heat-setting temperature can range between 150 to 235° C. with a temperature of 200 to 220° C. being preferred.

The wide variety of new and novel surface modified polyester films and the procedures for their preparation will now be illustrated in the examples to follow:

EXAMPLES 1–14

These examples illustrate the general mode of preparing the surface-modified polyester films characterizing the process of the present invention.

Substantially amorphous (as extruded) polyethylene terephthalate film, 25 to 30 mils in thickness, is conducted through an organic liquid treating apparatus such as that shown in the drawing.

After being subjected to the surface-modification treatment and dried, the film is then molecularly oriented by stretching in two mutually perpendicularly directions to an extent of approximately 3.0 times its original dimensions. The film is stretched first in the longitudinal direction at a temperature of 85° C. in a nip-roll stretching apparatus such as described in U.S. Patent 2,995,779 and thereafter stretched in a tentering device at a temperature of 85 to 90° C. The film, now approximately 3 mils in thickness, is then heat-set at 220° C. in an extension of the tentering device. As will be seen in examples to follow, it is critical that the film be in an unoriented state during the surface modification treatment.

Table II below illustrates the surface-modification effects realized by processing several film samples in a manner such as described above utilizing various liquid organic surface-modifiers selected from the list of applicable candidates referred to in Table I. Listed for each example and a non-surface-modified (control) film are the liquid agent employed, time of contact of the organic liquid with the film, the surface effect realized, and the critical physical properties of the film (i.e., modulus, tensile strength, $F_5$, and elongation).

TABLE II.—PHYSICAL CHARACTERISTICS OF ORIENTED POLYETHYLENE TEREPHTHALATE FILMS TREATED WITH LIQUID ORGANIC MODIFYING AGENTS

| Example number | Modifying agent | Contact time (minutes) | Surface effect realized | Physical Properties* | | | | Dimensional stability (percent) at 200° C. |
|---|---|---|---|---|---|---|---|---|
| | | | | Modulus, p.s.i. ×10⁻⁵ | Tensile strength, p.s.i. ×10⁻⁵ | $F^5$, p.s.i. ×10⁻⁵ | Elongation | |
| Control | | | | 5.41 | .188 | .134 | 74 | 5.9 |
| 1 | 1,2-dichloroethane | 1.0 | Porous surface, good wicking action. | 5.71 | .248 | .136 | 176 | |
| 2 | Dichloromethane | 1.0 | Delustered surface | 5.21 | .188 | .130 | 164 | 2.75 |
| 3 | do | 1.5 | do | 5.30 | .212 | .131 | 201 | |
| 4 | do | 2.0 | do | 5.62 | .211 | .147 | 125 | 5.5 |
| 5 | do | 5.0 | do | 5.00 | .199 | .131 | 138 | |
| 6 | s-Tetrachloroethane | 5.0 | Wax-like texture, slightly roughened surface. | 5.19 | .271 | .132 | 119 | |
| 7 | Aniline | 1.0 | Delustered surface | 5.43 | .216 | .140 | 139 | |
| 8 | Dimethylformamide | 2.0 | Porous surface, good wicking action. | 5.05 | .183 | .126 | 124 | |
| 9 | Tetrahydrofuran | 0.25 | Intermediate roughened surface. | 5.01 | .175 | .125 | 121 | |
| 10 | P-dioxane | 2.0 | do | | | | | |
| 11 | Benzylamine | 1.0 | Delustered, decorative scotch grain leather-like effect. | | | | | |
| 12 | Benzylamine-dichloromethane | 1.0 | Rough, abrasive sand paper effect. | | | | | |
| 13 | s-Tetrachloroethane-s-tetrabromoethane | 0.5 | Metalized decorative effect | | | | | |
| 14 | 1,1,2-trichloroethane | 1.0 | Roughened surface, readily receptive to dyestuffs. | | | | | |

*Average of longitudinal and transverse direction properties.

As can be seen from the examples listed in Table II, a wide variety of new and novel surface characteristics are imparted to the films treated according to the process of the present invention. It can also be seen by comparing the physical properties of the treated films with those of the unmodified control film that the critical physical properties of the film are not impaired by the surface-modification treatment.

EXAMPLE 15

This example illustrates the criticality of subjecting the film to the action of the liquid organic modifier prior to any molecular orientation step. The following films are treated with benzylamine, s-tetrachloroethane, dichloromethane, pyridine, aniline, 1,1,2 - trichloroethane, and tetrahydrofuran in a manner described hereinbefore:

(1) Substantially amorphous polyethylene terephthalate film—subsequently stretched 3.0× its original dimensions in both directions and heat-set at 220° C.

(2) Polyethylene terephthalate film stretched 3.0× its initial length (LD)

(3) Polyetheylene tereththalate film stretched 3.0× its initial width (TD)
(4) Polyethylene terephthalate film stretched 3.0× its initial dimensions in both the longitudinal and transverse directions
(5) Polyethylene terephthalate film stretched 3.0× its initial dimensions in both the longitudinal and transverse directions and heat-set at 220° C.

Table III, below, shows the results of these tests.

TABLE III

| Type film treated | Effectiveness of treatment with various organic agents |
| --- | --- |
| Substantially amorphous p.t.* film—stretched 3.0× in LD and TD after treatment and heat-set. | Surface-modification effected in all cases. |
| One-direction (LD) stretched p.t.* film. | No surface-modification noted. |
| One-direction (TD) stretched p.t.* film. | Do. |
| Bi-directionally stretched non-heat-set p.t.* film. | Do. |
| Bi-directionally stretched heat-set p.t.* film. | Do. |

* Polyethylene terephthalate.

As can be seen from the table, surface-modification is obtained only when the organic liquid modifying agent is applied to the film in an unoriented state. The surface modification of films that results when a film in an unoriented state is treated with organic liquid modifiers and then subsequently oriented cannot be duplicated by treatment of a film which has undergone either complete or partial orientation proir to treatment with the modifier.

EXAMPLE 16

Monomeric ethylene naphthalene 2,6-dicarboxylate is prepared by carrying out an ester-interchange reaction in a conventional manner between ethylene glycol and dimethyl naphthalene 2,6-dicarboxylate, utilizing a catalyst system comprising manganous acetate [MN (OAC)$_2$ 4H$_2$O] and antimony trioxide (Sb$_2$O$_3$).

A polymer is prepared from this monomeric composition using the following formation:

600 g. ethylene naphthalene 2,6-dicarboxylic monomer
0.07 g. zinc acetate dihydrate
0.025 g. antimony trioxide
0.019 g. lithium hydride The polymerization reactions are carried out at a temperature of 285-290° C. under reduced pressure within the range from 0.05-2.5 mm. of mercury. The polymerization reaction is carried out until an intrinsic viscosity of at least 0.5 is obtained. Thereafter, the polymer is extruded into the form of a film and quenched. The thus prepared film is then treated with 1,2-dichlorethane in the manner hereinbefore described for 30 seconds. After being dried, the film is molecularly oriented by stretching in the manner previously described to an extent of 4 times in both the longitudinal and transverse directions. The film is heat-seat at a temperature of 220-240° C. A semiopaque film resulted having an attractive metallic sheen ideally suited for decorative purposes.

It has been found that a wide variety of new and useful surface modified polymeric synthetic linear polyester film can be prepared by treatment of the unoriented polyester film with various liquid organic modifying agents prior to the first direction stretching operation. The degree and type of surface modification can be varied by the selection of the organic liquid to be employed. The unique surface characteristics of the films prepared by the process of the present invention can find utility in a variety of commercial applications such as friction coating for transformers and wire and cable uses, adhesive and coating anchorage for abrasive belts and writable surfaces. As specific illustrations, the following can be cited:

(1) Porous film surfaces such as provided by treating polyester film with dimethyl formamide or 1,2-dichloroethane produces a porous film surface as evidenced by the capillary action of drafting ink applied to the film surface. This type of surface finds utility in electrical applications where it is desirable to impregnate the film.

(2) Roughened film surfaces possessing degrees of roughness varying from a wax-like texture to a rough, abrasive sandpaper effect can be realized by the surface-modification process. Utilization of s-tetrachloroethane as the surface modifier results in a film having a wax-like texture. Rough, abrasive sandpaper effects are realized with benzylamine. Intermediate surfaces are observed when p-dioxane and tetrahydrofuran are employed as the organic liquid agents. The effect of surface roughness by organic liquids can be modified by using a binary mixture of organic liquids (benzylamine-dichloromethane). By varying the amounts of the components of the binary mixture, film surface roughness can be controlled. Film roughness can also be controlled by a two-step liquid treating technique. For example, treatment of amorphous polyethylene terephthalate first with benzylamine and then dichloromethane or the reverse sequence, dichloromethane and then benzylamine, shows that a variety of roughened surfaces can be prepared. Control of surface roughness offers possible product application for friction coating for transformers and wire and cable uses, anti-slip, adhesive and coating anchorage for abrasive belts, and writable film surfaces.

(3) Delustered film surfaces.—A variety of organic liquid modifiers (particularly most polychlorinated aliphatic hydrocarbons) have been found to yield high haze, low gloss films. Surface delustering can also be produced utilizing a two-step bath process. For example, treatment with dichloromethane followed by treatment with benzylamine. Films having such delustered surfaces will find use in markets requiring "anti-glare" surfaces.

(4) Decorative surfaces.—Treatment of unoriented polyester films with specified organic liquid modifiers are capable of producing modified film surface which are striking in appearance and have potential use in decorative surfacing applications. For example, benzylamine produces an unusual surface design resembling scotch grain leather. A binary mixture of s-tetrachloroethane and s-tetrabromoethane produces a modified surface having a silver-like appearance resembling metallized film. Dyed polyester films can be prepared by simply adding a soluble dye such as crystal violet or malachite green to the organic liquid modifier (e.g., 1,1,2-trichloroethane).

What is claimed is:
1. A process for treating film structures of linear polymeric polyesters to modify the surface appearance and surface characteristics thereof which comprises contacting an amorophous linear polymeric polyester film of a period of time within the range of about 5 seconds to 5 minutes with a binary mixture of s-tetrachloroethane and s-tetrabromoethane having a dye receptivity-opacity development rating of at least 130; removing the excess of said binary mixture from said film; molecularly orienting said film by stretching in both the longitudinal and transverse directions to an extent of at least 2.5 times its original dimensions and heat-setting said film at a temperature of at least 150° C. whereby the surface of said treated film structure is characterized by a metallized appearance.

References Cited

UNITED STATES PATENTS

| 2,336,384 | 12/1943 | Baker et al. | 264—343 |
| 3,102,323 | 9/1963 | Adams | 264—211 |
| 3,155,754 | 11/1964 | Adams | 264—343 |
| 3,179,484 | 4/1965 | Tessandori et al. | 264—343 |
| 2,830,030 | 4/1958 | Fuchs | 260—32.4 |

JULIUS FROME, Primary Examiner.

A. H. KOECKERT, Assistant Examiner.

U.S. Cl. X.R.

8—4, 130.1; 264—78, 171, 289